United States Patent
Wei et al.

(10) Patent No.: US 10,866,162 B2
(45) Date of Patent: Dec. 15, 2020

(54) ONLINE FAULT DETECTION DEVICE INSTALLED IN TRAIN CAR AND USED FOR HIGH-SPEED TRAIN RUNNING COMPONENT

(71) Applicants: HEFEI GOCOM INFORMATION & TECHNOLOGY CO., LTD., Anhui (CN); HEFEI UNIVERSITY OF TECHNOLOGY, Anhui (CN)

(72) Inventors: Zhen Wei, Anhui (CN); Jian Chen, Anhui (CN); Lei Cheng, Anhui (CN); Qingxin Hu, Anhui (CN); Jiazhu Li, Anhui (CN); Pin Chen, Anhui (CN); Yunan Cheng, Anhui (CN)

(73) Assignees: HEFEI GOCOM INFORMATION & TECHNOLOGY CO., LTD., Anhui (CN); HEFEI UNIVERSITY OF TECHNOLOGY, Anhui (CN)

( * ) Notice: Subject to any disclaimer, the term of this patent is extended or adjusted under 35 U.S.C. 154(b) by 201 days.

(21) Appl. No.: 16/313,259

(22) PCT Filed: Mar. 1, 2017

(86) PCT No.: PCT/CN2017/075287
§ 371 (c)(1),
(2) Date: Dec. 26, 2018

(87) PCT Pub. No.: WO2018/120408
PCT Pub. Date: Jul. 5, 2018

(65) Prior Publication Data
US 2019/0154547 A1 May 23, 2019

(30) Foreign Application Priority Data
Dec. 26, 2016 (CN) .......................... 2016 1 1220721

(51) Int. Cl.
*G01M 17/08* (2006.01)
*B61L 15/00* (2006.01)

(52) U.S. Cl.
CPC .......... *G01M 17/08* (2013.01); *B61L 15/0081* (2013.01)

(58) Field of Classification Search
CPC .............. G01M 17/08–10; B61L 15/00; B61L 15/0081
See application file for complete search history.

(56) References Cited

U.S. PATENT DOCUMENTS

| 9,092,914 B2 | 7/2015 | Muetzel et al. | |
| 2013/0211737 A1* | 8/2013 | Batcheller | G01M 7/00 702/34 |

(Continued)

FOREIGN PATENT DOCUMENTS

| CN | 101526426 A | 9/2009 |
| CN | 101650221 A | 2/2010 |

(Continued)

OTHER PUBLICATIONS

International Patent Application No. PCT/CN2017/075287, International Search Report and Written Opinion dated Sep. 30, 2017, 9 pages (including 2 pages English translation of the International Search Report).

*Primary Examiner* — Nguyen Q. Ha
(74) *Attorney, Agent, or Firm* — Fredrikson & Byron, P.A.

(57) ABSTRACT

Provided in the present disclosure is an online fault detection device installed in a train car and used for a high-speed train running component comprising a GPS module (1), a noise sensor (2), a 3G module (5), a solid-state drive (6), a microprocessor (4), a status indicator (3), and a buzzer (7). Input ends of the microprocessor (4) are connected to an output end of the GPS module (1) and an output end of the (Continued)

noise sensor (2) respectively. Output ends of the microprocessor (4) are connected to an input end of the status indicator (3) and an input end of the buzzer (7) respectively. The microprocessor (4) is interactively connected to the 3G module (5) and the solid-state drive (6) respectively. The device above is reliable and easy to be installed and maintained; and the components and sensor thereof are not prone to be damaged. In addition, when a high-speed train is operating, the device can detect an early unstable fault signal subjected to multiple kinds of interference, and provide an alarm prompt rapidly.

4 Claims, 2 Drawing Sheets

(56) References Cited

U.S. PATENT DOCUMENTS

| | | | |
|---|---|---|---|
| 2018/0208221 A1* | 7/2018 | Singh | G07C 5/0858 |
| 2019/0232978 A1* | 8/2019 | Im | B61C 17/12 |

FOREIGN PATENT DOCUMENTS

| | | |
|---|---|---|
| CN | 201666815 U | 12/2010 |
| CN | 103018046 A | 4/2013 |
| CN | 106198062 A | 12/2016 |

\* cited by examiner

ONLINE FAULT DETECTION DEVICE INSTALLED IN TRAIN CAR AND USED FOR HIGH-SPEED TRAIN RUNNING COMPONENT

CROSS-REFERENCE

The present application is a 35 U.S.C. 371 national phase filing from International Application No. PCT/CN2017/075287, filed Mar. 1, 2017, entitled "Online Fault Detection Device Installed in Train Car and Used for High-speed Train Running Component" which claims priority to Chinese Patent Application No. 2016112207219, filed on Dec. 26, 2016, entitled "Online Fault Detection Device Installed in Train Car and Used for High-speed Train Running Component", the disclosures of which are incorporated herein by reference in their entirety.

FIELD OF TECHNOLOGY

The present disclosure relates to the technical field of railway transportation safety monitoring, and particularly to an online fault detection device installed in train car and used for high-speed train running component.

BACKGROUND

Currently, there are mainly two methods for online detection of the running components of high-speed trains. One method is to install some sensors on the train running components and data acquisition equipment in the train car to detect the running components online by collecting data from external sensors. This method has the following disadvantages: 1. it is very complicated to install the sensors, a sufficient number of sensors need to be installed so as to meet the functional requirements, and they may affect the mechanical properties of the running components. 2. the wiring and routing from the sensors to the acquisition equipment inside the train car is very troublesome, and it is very difficult to add the device on the existing trains. 3. the sensors are easy to be damaged, the equipment maintenance is difficult, and the maintenance cost is high. The other method is to patrol the train car periodically by personnel to feel the abnormal noise in the train car, and determine by personnel whether the train is abnormal. By the other method, a real-time monitoring of the state of the train car cannot be realized, and the patrol can only be intermittent; and since the sensitivity and the range of recognized frequency of human ear are small, some fault noise signals are unrecognizable to human ear.

SUMMARY

The present disclosure aims to provide an online fault detection device installed in train car and used for high-speed train running component capable of overcoming the defects in the prior art, and having the advantages that the device is easy to install, reliable, and easy to maintain, and the components and sensors thereof are not prone to be damaged. In addition, when a high-speed train is operating, the device can detect an early unstable fault signal subjected to multiple kinds of interference, and rapidly provide an alarm prompt.

In order to achieve the object above, the present disclosure adopts the following technical solutions:

An online fault detection device installed in a train car and used for a high-speed train running component, comprises a GPS module, a noise sensor, a 3G module, a solid-state drive, a microprocessor, a status indicator, and a buzzer; input ends of the microprocessor are connected to an output end of the GPS module and an output end of the noise sensor respectively; output ends of the microprocessor are connected to an input end of the status indicator and an input end of the buzzer respectively; the microprocessor is interactively connected to the 3G module and the solid-state drive respectively;

the GPS module is configured to collect position information and speed information of the train;

the noise sensor is installed on a floor of the train car and includes a first noise sensor configured to collect noise signals transmitted by a train car body and a second noise sensor configured to collect noise signals in the train car jointly transmitted by the train car body and the air;

the solid-state drive is configured to preset a normal running spectral database and a fault spectral database of the train car, and to store the noise signals collected by the noise sensor;

the microprocessor is configured to generate a waterfall color block spectrum by periodically collecting the noise signals through the noise sensor, and performing a short-time Fourier transform on time domain data stream of the noise signals, and then compare the waterfall color block spectrum with an environmental noise spectrum to obtain a characteristic type of measured noise, thereby obtaining a cutoff frequency parameter of a high-order IIR low-pass filter;

the microprocessor is further configured to calculate a spindle rotational speed of the train car according to the position information and speed information of the train collected by the GPS module, and process the spindle rotational speed and the waterfall color block spectrum to generate a waterfall color block order spectrum; and then generate a time domain queue for each of order noise level values to obtain steady-state components for each order noise level;

the microprocessor is further configured to compare the steady-state components for each order noise level with the normal running spectral database of the train, and determine whether a deviation exceeds standard according to comparison deviation results, if the deviation exceeds the standard, the microprocessor performs a fault alarm, and compares the deviation with the fault spectrum, if the deviation is not in the fault spectrum, the microprocessor uses it as suspected fault spectrum data;

the microprocessor is further configured to input the alarmed suspected fault spectrum data into the database and manage the database; and determine that the suspected fault spectrum data is added into the fault spectral database, or into the normal running spectral database of the train through filtering and determining by human intervening and judging, thus achieving continuous updating and improvement of the fault spectral database and the normal running spectral database of the train;

the microprocessor is further configured to perform data interaction with a ground information center through the 3G module;

the status indicator is configured to perform a fault indication;

the buzzer is configured to prompt alarm.

Further, the GPS module is connected to the microprocessor through an RS232 serial port.

Further, the 3G module is connected to the microprocessor through an RS232 serial port.

Further, a shielding case is provided outside the first noise sensor.

The present disclosure has the following advantages:

(1) The fault detection device of the present disclosure is completely installed inside the train car, the noise sensor thereof is installed on the floor of the train car without installing the sensor on the running component below the train car, which significantly reduces the difficulty in installation and maintenance, and does not affect the running safety of train. The device is easy to install, reliable, and easy to maintain, and the components and sensor thereof are not prone to be damaged.

(2) The fault detection device of the present disclosure can detect the early unsteady and multiple interference fault signal, and provide an alarm prompt rapidly when the train is operating.

(3) By the fault detection device of the present disclosure, sound and light alarms locally can be generated and the alarm information can be transmitted to the ground information center in time through the 3G network. After the ground information center is aware of the alarm, it can promptly notify the crew on board to make emergency treatment.

Wherein:
1. GPS module, 2. noise sensor, 3. status indicator, 4. microprocessor, 5. 3G module, 6. solid-state drive, 7. buzzer, 8. online fault detection device installed in train car and used for high-speed train running component, 9. train car, 10. ground information center.

DETAILED DESCRIPTION

The present disclosure will be further described hereinafter with reference to the drawings.

Figure 1:
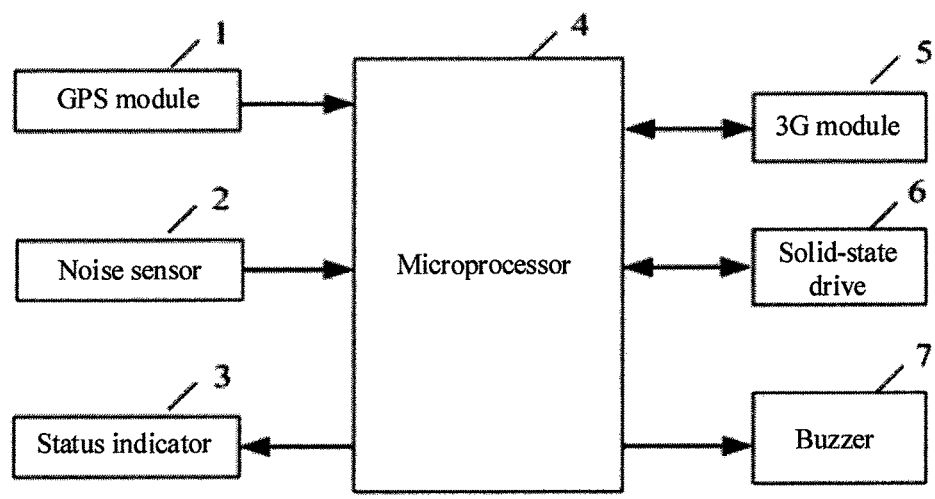
FIG. 1 is a structural diagram of the present disclosure.

As shown in FIG. 1, an online fault detection device installed in train car and used for high-speed train running component, comprises a GPS module 1, a noise sensor 2, a 3G module 5, a solid-state drive 6, a microprocessor 4, a status indicator 3, and a buzzer 7. Input ends of the microprocessor 4 are connected to an output end of the GPS module 1 and an output end of the noise sensor 2 respectively. Output ends of the microprocessor 4 are connected to an input end of the status indicator 3 and an input end of the buzzer 7 respectively. The microprocessor 4 is interactively connected to the 3G module 5 and the solid-state drive 6 respectively. The GPS module is connected to the microprocessor through an RS232 serial port. The 3G module is connected to the microprocessor through an RS232 serial port.

Further, the GPS module 1 is configured to collect position information and speed information of the train.

Further, the 3G module in the present disclosure enables the device to perform data interaction with a ground information center 10 through the 3G network. The content of the data interaction includes: the configuration, command data and normal running sound spectrum and fault spectrum data sent to the fault detection device of a running component 8 from the ground information center; status and fault alarm information and collected suspected fault spectrum data sent to the ground information center from the fault detection device of running component 8.

Further, the noise sensor 2 is installed on a floor of the train car 9 and includes at least two noise sensors, specifically, it includes a first noise sensor configured to collect noise signals transmitted by the train car body and a second noise sensor configured to collect noise signals in the train car jointly transmitted by the train car body and the air. A shielding case is provided outside the first noise sensor configured to collect the noise signals transmitted by the train car body. While no shielding case is provided outside the second noise sensor configured to collect the noise signals in the train car jointly transmitted by the train car body and the air.

Further, the solid-state drive 6 on the one hand is configured to preset a normal running spectral database and a fault spectral database of the train car as a comparison database of a fault identification algorithm; on the other hand, it is configured to store the noise signals collected by the noise sensor for optimizing and improving the normal running spectral database and the fault spectral database.

Figure 2:
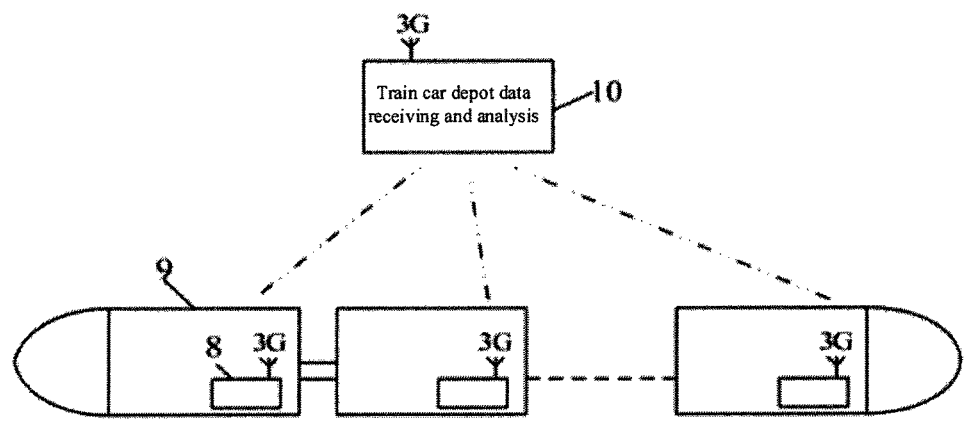
FIG. 2 is a schematic view showing the installation position of the present disclosure.

As shown in FIG. 2, the online fault detection device installed in train car and used for high-speed train running component of the present disclosure is completely installed inside the train car 9.

Figure 3:
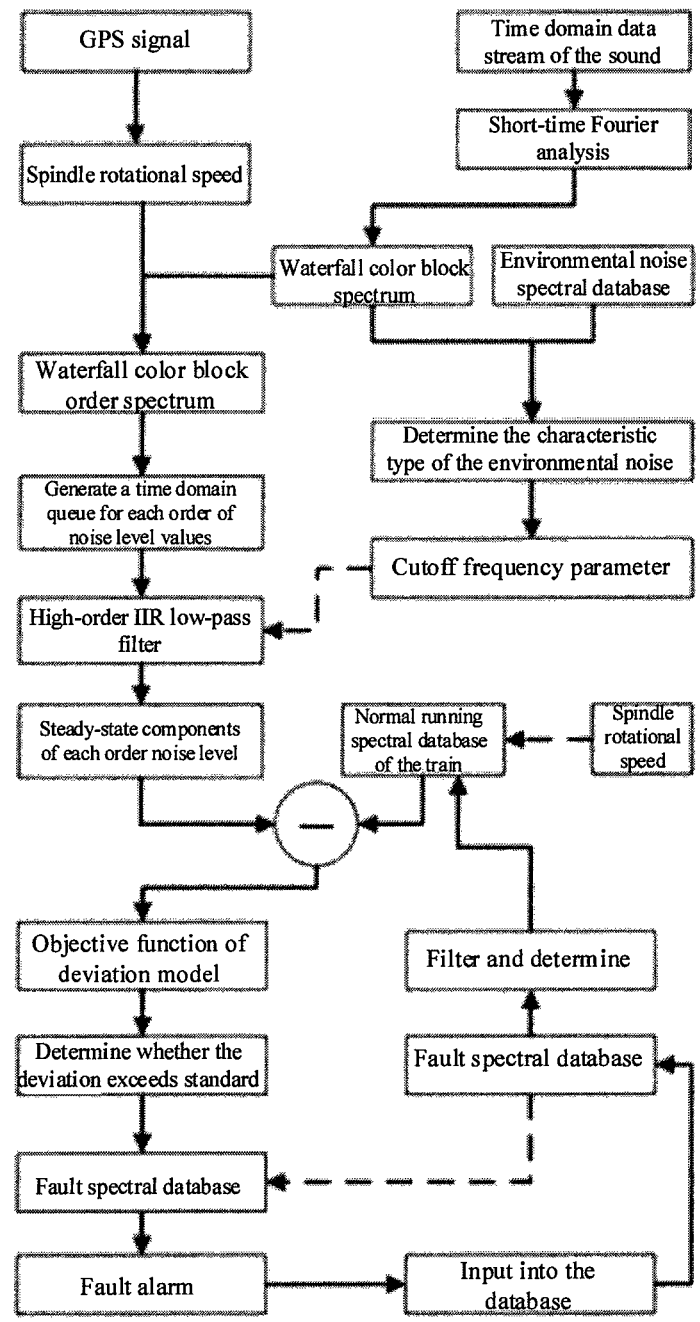
FIG. 3 is a flow chart of the working process of the present disclosure.

As shown in FIG. 3, the microprocessor 4 is configured to generate a waterfall color block spectrum by periodically collecting the noise signals through the noise sensor, and performing a short-time Fourier transform on time domain data stream of the noise signals, and then compare the waterfall color block spectrum with an environmental noise spectrum to obtain a characteristic type of measured noise, thereby obtaining a cutoff frequency parameter of a high-order IIR low-pass filter. The waterfall color block spectrum is a kind of 3D map. The x-axis represents the frequency of the spectrum, the y-axis represents time, and the chronologically measured spectra are arranged in order like a waterfall. The z-axis represents the energy of the spectrogram, and its magnitude is distinguished by color, which is a binary function of the frequency and time. Environmental noise spectrum: an environmental noise spectrum is a waterfall color block spectrum generated by using the pre-acquired environmental background noise.

Further, the microprocessor 4 is further configured to calculate a spindle rotational speed of the train car according to the position information and speed information of the train collected by the GPS module, and process the spindle rotational speed and the waterfall color block spectrum to generate a waterfall color block order spectrum; and then generate a time domain queue for each of order noise level values to obtain steady-state components for each order noise level after the time domain queue passes the high-order IIR low-pass filter. The waterfall color block order spectrum is a waterfall color block spectrum after the x-axis is changed into the order. The order noise level value is the maximum value of the acoustic energy at a certain order in the order spectrum.

Further, the microprocessor 4 is further configured to compare the steady-state components for each order of noise level with the normal running spectral database of the train, and determine whether a deviation exceeds standard according to comparison deviation results, if the deviation exceeds the standard, the microprocessor gives a fault alarm, and compares the deviation with the fault spectrum, if the deviation is not in the fault spectrum, the microprocessor uses it as suspected fault spectrum data. The normal running spectral database of the train is a spectral database composed of the steady-state components for the order noise levels generated by various sounds collected during the normal running of the train that has no fault.

Further, the microprocessor 4 is further configured to input the alarmed suspected fault spectrum data into the database; and determine that the suspected fault spectrum data is added into the fault spectral database, or into the normal running spectral database of the train through filtering and determining by human intervening and judging, thus achieving continuous updating and improvement of the fault spectral database and the normal running spectral database of the train. The fault spectral database is a spectral database composed of the steady-state components of the order noise levels generated by various sounds collected when the faulted train is running or the failed running component is operating.

Further, the microprocessor 4 is further configured to perform data interaction with the ground information center through the 3G module.

Further, the status indicator 3 is configured to perform a fault indication.

Further, the buzzer 7 is configured to prompt alarm.

In summary, by adopting a high-resolution noise sensor and an embedded microprocessor in the present disclosure, real-time acquisition of noise signals in the train car can be achieved, a cyclical non-steady-state signal processing method can be established for the fault signals that are in a non-steady state and subjected to multiple kinds of interference in the early stage of the operation fault of the high-speed train, so as to extract and recognize the weak fault signals, and perform audible and visual alarm on the fault signals to remind the crew to act accordingly. At the same time, in the present disclosure, the alarm information can also be reported to the ground information center through the 3G network, so as to remind the relevant personnel on the ground to carry out emergency treatment.

The embodiments described above are only for describing the preferred embodiments of the present disclosure, and are not intended to limit the scope of the present disclosure. Various modifications and improvements of the technical solutions of the present disclosure may be made by those of ordinary skill in the art without departing from the design spirit of the present disclosure. Those modifications and improvements should be within the scope defined by the claims of the present disclosure.

What is claimed is:

1. An online fault detection device installed in a train car and used for a high-speed train running component, comprising a GPS module, a noise sensor, a 3G module, a solid-state drive, a microprocessor, a status indicator, and a buzzer; wherein input ends of the microprocessor are connected to an output end of the GPS module and an output end of the noise sensor respectively; output ends of the microprocessor are connected to an input end of the status indicator and an input end of the buzzer respectively; the microprocessor is interactively connected to the 3G module and the solid-state drive respectively;

the GPS module is configured to collect position information and speed information of the train;

the noise sensor is installed on a floor of the train car and includes a first noise sensor configured to collect noise signals transmitted by a train car body and a second noise sensor configured to collect noise signals in the train car jointly transmitted by the train car body and the air;

the solid-state drive is configured to preset a normal running spectral database and a fault spectral database of the train, and to store the noise signals collected by the noise sensor;

the microprocessor is configured to generate a waterfall color block spectrum by periodically collecting the noise signals through the noise sensor, and performing short-time Fourier transform on time domain data stream of the noise signals, and then compare the waterfall color block spectrum with an environmental noise spectrum to obtain a characteristic type of measured noise, thereby obtaining a cutoff frequency parameter of a high-order IIR low-pass filter;

the microprocessor is further configured to calculate a spindle rotational speed of the train car according to the position information and the speed information of the train collected by the GPS module, and process the spindle rotational speed and the waterfall color block spectrum to generate a waterfall color block order spectrum; and then generate a time domain queue for each of order noise level values to obtain steady-state components for each order noise level after the time domain queue passes the high-order IIR low-pass filter;

the microprocessor is further configured to compare the steady-state components for each order noise level with the normal running spectral database of the train, and determine whether a deviation exceeds standard according to comparison deviation results, if the deviation exceeds the standard, the microprocessor performs a fault alarm, and compares the deviation with the fault spectrum, if the deviation is not in the fault spectrum, the microprocessor uses it as suspected fault spectrum data;

the microprocessor is further configured to input the alarmed suspected fault spectrum data into the database and manage the database; and determine that the suspected fault spectrum data is added into the fault spectrum database, or into the normal running spectral database of the train through filtering and determining by human intervening and judging, thus achieving continuous updating and improvement of the fault spectral database and the normal running spectral database of the train;

the microprocessor is further configured to perform data interaction with a ground information center through the 3G module;

the status indicator is configured to perform a fault indication;

the buzzer is configured to prompt alarm.

2. The online fault detection device installed in a train car and used for a high-speed train running component of claim 1, wherein the GPS module is connected to the microprocessor through an RS232 serial port.

3. The online fault detection device installed in a train car and used for a high-speed train running component of claim 1, wherein the 3G module is connected to the microprocessor through an RS232 serial port.

4. The online fault detection device installed in a train car and used for a high-speed train running component of claim 1, wherein a shielding case is provided outside the first noise sensor.

* * * * *